United States Patent [19]

Foster

[11] 4,172,392
[45] Oct. 30, 1979

[54] PEDAL ACTUATED BICYCLE BRAKE WITH COORDINATING SUPPORT STAND

[76] Inventor: Edwin E. Foster, 1801 Camp Craft Rd., Austin, Tex. 78746

[21] Appl. No.: 785,310

[22] Filed: Apr. 6, 1977

Related U.S. Application Data

[62] Division of Ser. No. 547,574, Feb. 6, 1975, Pat. No. 4,030,774.

[51] Int. Cl.² ............................ G05G 1/14; B62H 1/08
[52] U.S. Cl. ................................. 74/594.5; 74/594.6; 280/289 R; 280/294
[58] Field of Search ................ 280/294, 259, 289 R; 74/594.5, 594.6, 594.1, 594.2, 594.3, 594.4

[56] References Cited

U.S. PATENT DOCUMENTS

| 587,536 | 8/1897 | Terver | 74/594.6 |
| 616,489 | 12/1898 | Ramsey | 74/594.5 |
| 640,380 | 1/1900 | Hart | 280/294 |
| 642,283 | 1/1900 | Barker | 280/294 |
| 644,818 | 3/1900 | Diebel | 74/594.5 |
| 644,819 | 3/1900 | Diebel | 74/594.5 |
| 681,214 | 8/1901 | Glover | 74/594.5 |

FOREIGN PATENT DOCUMENTS

| 1014960 | 8/1952 | France | 74/594.1 |
| 1025478 | 4/1953 | France | 74/594.4 |
| 314830 | 6/1956 | Switzerland | 74/594.4 |
| 22316 | of 1903 | United Kingdom | 74/594.6 |
| 27794 | of 1912 | United Kingdom | 280/294 |
| 664053 | 1/1952 | United Kingdom | 74/594.4 |

*Primary Examiner*—John P. Silverstrim
*Attorney, Agent, or Firm*—Kalish & Gilster

[57] ABSTRACT

In a bicycle having the usual main shaft with a pedal crank normal thereto, a pedal assembly wherein the foot support may be in the same plane as a shaft secured to the pedal crank or below same, such latter being of the underslung type. A toe clip and a rigid support stand are provided on the pedal and being so constructed and arranged that when in disuse, the toe clip will be presented for facile insertion of the operator's foot and with the support stand in operative bicycle supporting position. In one form of the invention, a bearing structure is provided on the shaft engaged to the crank and with a plate disposed on said bearing structure to which the pedal is secured; said plate extending forwardly and rearwardly of the bearing structure and such relationship thereto as to create a counterbalance for the toe clip. In such last mentioned arrangement, the support surface comprises an arm or arms tapering in thickness from the plate adjacent portion to the plate remote portion to provide maximum ground clearance in event of tilting.

12 Claims, 20 Drawing Figures

FIG.1

PEDAL ACTUATED BICYCLE BRAKE WITH COORDINATING SUPPORT STAND

This is a Division of application Ser. No. 547,574 filed Feb. 6, 1975 now U.S. Pat. No. 4,030,774.

BACKGROUND AND SUMMARY OF THE INVENTION

This invention relates in general to bicycles and, more particularly, to bicycle brake assemblies.

It is an object of the present invention to provide a pedal assembly for bicycles which are peculiarly adapted to incorporate either a toe clip or a support stand, or both.

It is another object of the present invention to provide a bicycle pedal brake assembly of the underslung type wherein the foot supporting portion is located downwardly of the pivot axis of the pedal.

It is a still further object of the present invention to provide a support stand for mounted disposition upon a pedal, equipped with a toe clip; which is automatically swung into bicycle support position upon removal of the operator's foot and which is especially adapted for current low slung pedals.

It is another object of the present invention to provide a bicycle incorporating a unique pedal construction equipped with the usual toe clip and having support stand means.

It is a further object of the present invention to provide for use with bicycles of the present invention, a pedal equipped with the customary toe clip and having a guide component for facilitating entry of the foot into such pedal from a position of disuse.

It is a still further object of the present invention to provide for use with bicycles of the present invention a pedal equipped with a toe clip and having a counterbalancing component for resisting the torque inherently provided by the toe clip when the pedal is in disuse.

It is another object of the present invention to provide a pedal for use with bicycles wherein the foot-supporting portion is located downwardly of the axis of rotation of the pedal crank arm thereby endowing the pedal with a low, under-slung character and, accordingly, relatively depressing the center of gravity of the rider for enhanced comfort as well as increased safety.

It is a still further object of the present invention to provide a low, under-slung pedal of the type stated which may be toe clip equipped and yet suitably constructed for balancing so that the pedal will maintain horizontal disposition when in disuse.

DESCRIPTION OF THE PRACTICAL EMBODIMENTS

Figure 1:
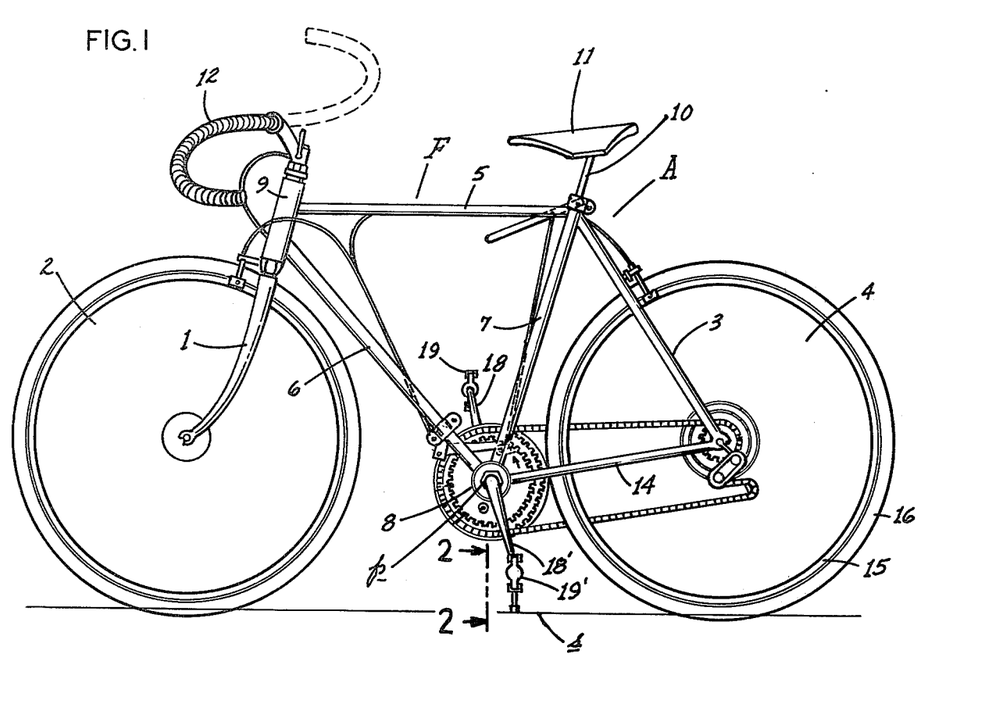
FIG. 1 is a side view of a bicycle having mounted thereon a pedal constructed in accordance with and embodying the present invention.

Referring now by reference numerals to the drawings which illustrate practical embodiments of the present invention, A generally designates a bicycle including a frame F, having a front fork 1 mounting a front wheel 2, a rear fork 3 mounting a rear wheel 4, with there being a cross bar 5 connecting said forks 1,3. Frame F also incorporates front and rear diagonal bars 6,7, respectively, which at their lower ends merge into the usual hub 8. At its forward, upper end, front diagonal bar 6 is integral with the upper portion or post 9 of front fork 1 while the upper end of rear diagonal bar 7 is unitary with the upper end of fork 3 and the rearward end of cross bar 5; there being the customary extensible rod 10 for accommodating a seat 11. Mounted upon post 9 are handle bars 12. Diverging rearwardly from hub 8 are the usual rear support bars 13,14 for the rearward axle a. Each wheel 2,4, which is of the usual spoke-type, embodies the customary rim 15 for receiving a tire 16. Hub 8 supports a shaft 17 of a pedal crank assembly, generally denoted p. Shaft 17 at each of its ends carries the usual pedal cranks 18,18' which at their lower ends carry foot pedals 19,19', respectively.

Figure 2:
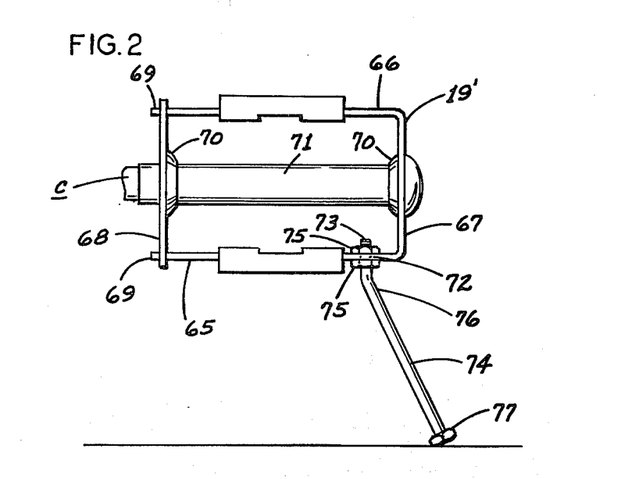
FIG. 2 is a front elevational view taken on the line 2—2 of FIG. 1.

Pedals 19,19' of bicycle A are of like, fundamentally conventional construction so that only description of pedal 19' as shown in FIG. 2 will be undertaken. Pedal 19' comprises normally front and rearward, planar parallel tread strips 65,66, respectively, which at their opposite ends are engaged to outer and inner side or lateral plates 67,68, respectively, being in mutually planar parallel relationship and with the connection to tread strip 65,66 being in any suitable manner, such as by means of interlocking tabs or tongues, as at 69, and/or with one of said side plates being integrally formed with said tread strip 65,66. Each side plate 67,68 is centrally provided with the usual aligned, relatively enlarged openings (not shown) for receiving the appropriate housings, as at 70, for securing a tubular casing 71 extending therebetween and through which projects the crank arm c formed at the lower end of pedal crank 18'; with there being the usual ball bearings (not shown) accommodated within said housings 70. In its outer end portion tread strip 65 is customarily provided with an opening, as at 72, for receiving the threaded end 73 of an elongated support rod 74. Nuts 75 are secured upon said threaded portion 73 on opposite sides of strip 65 to effect a rigid and reliable securement between support rod 74 and pedal 19'. With reference to FIG. 1, it will be seen that rod 74 is disposed within the plane of strip 65 but is bent immediately forwardly of threaded portion 73, as at 76, for extension in a direction laterally beyond the outer face of adjacent outer side plate 67 and on its outer end extremity mounts an enlarged support surface-engaging head 77. The length of rod 74 is such as to support bicycle A in a firm position of rest when in disuse wherein pedal 19' will be in generally vertical disposition as shown in the drawings. It will, of course, be observed that by mounting support rod 74 upon pedal 19', the latter, upon removal of the operator's foot, will be rocked about pedal crank 18' so as to present the support rod downwardly, through the eccentricity of weight distribution of said pedal 19' by reason of the securement thereon of said support rod 74.

Support rods 74 may obviously be mounted at any convenient location upon the respective pedals but are preferably adapted for engagement within an opening customarily provided in conventional pedals. Furthermore, since support rods 74 are within the plane of the engaged tread strips, the same will not cause any interference during normal cycling action. It is, of course, recognized that said support rods may be engaged to either of said tread strips 65,66 as the rocking action of the related pedal would be the same in either case, as well as in one end portion of outer side plate 67.

Figure 3:
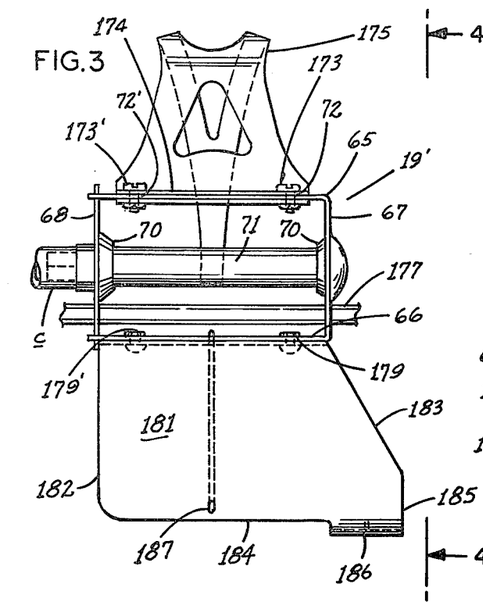
FIG. 3 is a front elevational view of a pedal useful with the bicycles of the present invention and being provided with a toe clip and another form of support stand constructed in accordance with and embodying the present invention; said pedal being illustrated in inoperative condition.
Figure 4:
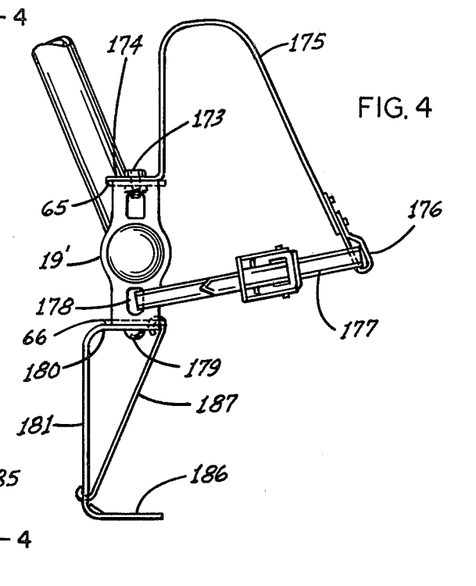
FIG. 4 is a side elevational view of the pedal shown in FIG. 3 as taken from the right hand side of FIG. 3.
Figure 5:
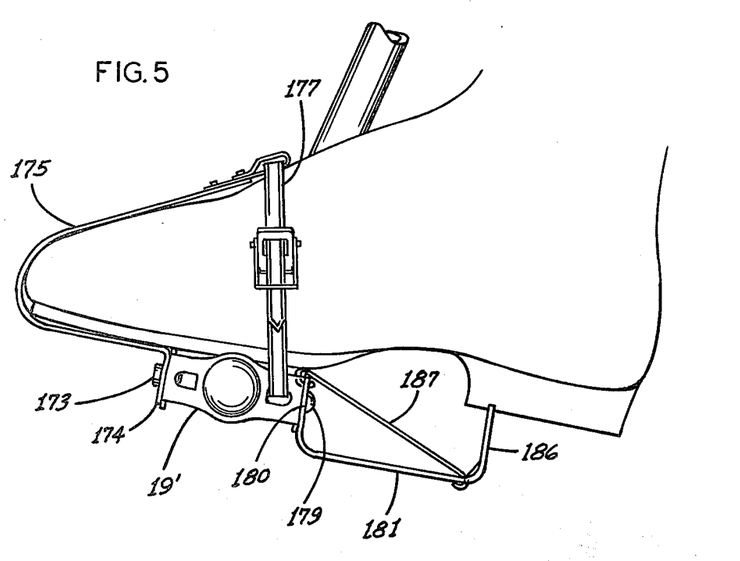
FIG. 5 is a side elevational view taken substantially on the right hand side of FIG. 3 but illustrating the associated pedal disposed for cycling action.
Figures 6, 7, 9:
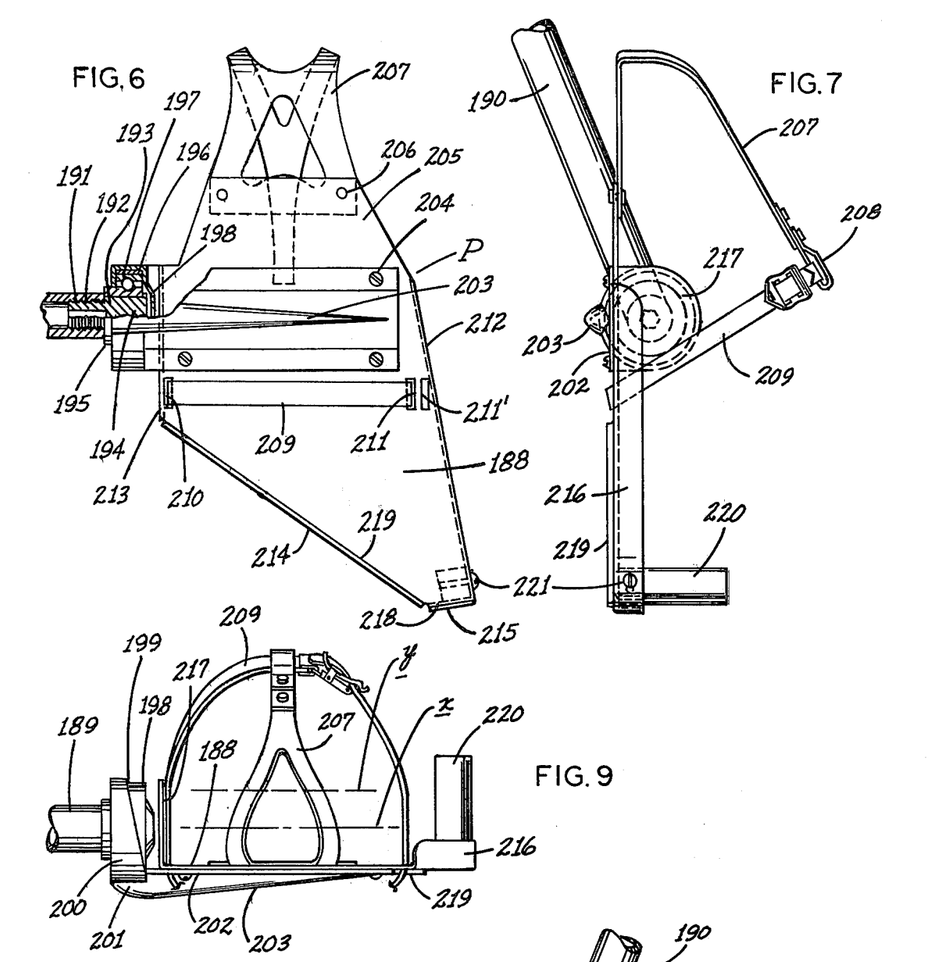
FIG. 6 is a front view of a further form of pedal constructed in accordance with and embodying the present invention, and being useful with the bicycles of the present invention; said pedal being illustrated in inoperative condition.
FIG. 7 is a side elevational view of the pedal shown in FIG. 6 as taken from the right hand side of FIG. 6.
FIG. 9 is a front end view taken on the line 9—9 of FIG. 8.
Figure 8:
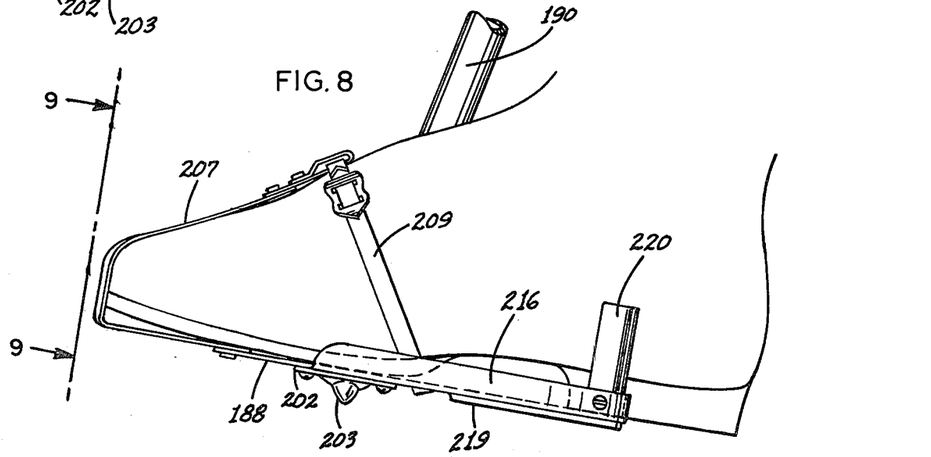
FIG. 8 is a side elevational view taken substantially on the right hand side of FIG. 6 but illustrating the pedal disposed for cycling action.

Referring now to FIGS. 3, 4, and 5, another form of pedal construction useful with bicycles A, hereinabove described is illustrated and which is fundamentally of the same character as foot pedal 19' above described and shown in FIG. 2 so that components thereof which correspond to the last mentioned pedal will carry like reference numerals for purposes of simplifying the description.

Outer tread strip 65 is provided with an opening 72' adjacent inner side plate 68 for cooperating with opening 72' to receive short bolts 173',173, respectively, for securement to said last mentioned strip of the lower mounting flange 174 of a conventional toe clip 175 which in its upper portion characteristically is directed normally rearwardly for disposition adjacent the upper portion of the operator's foot. At its rearward upper end said toe clip 175 is provided with a loop 176 for threading therethrough of the usual adjustable strap 177 which in its normally lower portion progresses through aligned openings 178 in the rearward portion of side plates 67,68. Thus, toe clip 175 will project forwardly of a front tread strip 65.

Secured upon normally rearward tread strip 66 as by rivets 179,179' is the mounting flange 180 of a plate 181, the plane of which is normal to mounting flange 180 and which projects rearwardly from said tread strip 66. Said plate 181 along its inner margin, as at 182, is substantially aligned with the inner side plate 68, while on its lateral outer margin said plate inclines laterally, outwardly, and rearwardly from outer side plate 67, as at 183. The rearward end margin 184 of plate 181 is parallel to tread plate 66 substantially throughout its extent with the exception that in its outer end portion projects slightly rearwardly, as at 185, to form the base of a support stand-forming flange 186, the plane of which is normal to that of plate 181 and which flange will be in generally upstanding relationship to said plate 181 when pedal 19' is in operating condition as illustrated in FIG. 5. As may best be seen in FIG. 3, said support stand flange 186 is located sufficiently laterally outwardly of pedal 19' so as not to interfere with proper positioning of the user's foot during bicycle operation.

It will be observed that with current bicycle pedals equipped with toe clips, such pedals when in disuse will be rocked, by virtue of the toe clip, into such position that the toe clip will be located upwardly and, hence, opening downwardly with resultant inconvenience to the operator for placing the foot upon such pedal. The foot manipulations of the operator may often cause an undesired spinning-like rotation of the pedal until the foot can be received within the toe clip.

With the present invention, plate 181 serves as a counterweight to the toe clip 175 and thereby providing a multiplicity of desirable functions. Firstly, plate 181 will assure that pedal 19' upon removal of the operator's foot will rock into vertical position with the toe clip 175 opening downwardly and plate 181 being in substantially planarwise perpendicular relationship to the support surface so that flange 186 is presented for engaging the particular support surface in order to support the bicycle A, in firm, stable condition of disuse. Such positioning is evident from FIG. 4. When the user desires to resume use of pedal 19', plate 181 serves to inhibit a spinning-like rotation of pedal 19' as the user initiates the foot placing operation since plate 181 will conduce to a more controlled rocking of pedal 19' from the position shown in FIG. 4 to that illustrated in FIG. 5 through an angle of substantially 90° so that the user will encounter no difficulty in placing the foot upon pedal 19'. It is to be especially observed that flange 186 is located sufficiently laterally outwardly so as to provide no interference or obstacle to the operator during usage of the bicycle.

Extending between rear tread plate 66 and the rearward end portion of plate 181 substantially centrally of inner side margin 182 and flange 186 is a wire 187 having its ends suitably hooked within openings formed in said plate 181 and tread strip 66. With pedal 19' in operating position, wire 187 will be inclined upwardly and forwardly toward tread strip 66 providing a ramp which serves as a guide for the toe of the user's foot as the same is moved into toe clip 175 and upon pedal 19' from a position of rest of pedal 19' as shown in FIG. 4.

Turning now to FIGS. 6-9, inclusive, a further form of pedal, indicated P, is shown which is useful with bicycle A, above described, as well as bicycles generally. Pedal P comprises a flat foot support member 188 (the mounting therefor to be described below) in the nature of a plate of relatively thin, rigidized, hardened character, and is presented beneath the normal axis of rotation, designated at x, of a pedal as established by pedal crank arm 189. In FIG. 23 the location of the upper edge of the usual tread strips, as in conventional pedals 19,19′ (above described) is indicated by the line y for graphically demonstrating the relative downward spacing therefrom of foot support member 188 thereby endowing pedal P with what might be considered an under-slung character. In actuality, the spacing differential, that is, between the upper surface of member 188 and line y is $1\frac{1}{4}''$ which will permit the rider to sit $1\frac{1}{4}''$ closer to the ground without sacrifice of road clearance. Accordingly, the bicycle seat and handle bar post may each be lowered $1\frac{1}{4}''$, while retaining the same toe to crotch distance. Dismounting is facilitated with the operator's toes reaching the ground more easily.

Pedal crank arm 189 is relative short projecting in the customary fashion from the normally lower end of the usual pedal crank 190 and at its outer end is internally threaded, as at 191, for accepting the external threads 192 of a head screw 193, as of the Allen type, which in its head portion 194 is fitted within the inner race 195 of a ball bearing assembly 196 having a relatively reduced outer race 197 for facilitating pressing of the ball bearing assembly 196 into a stamped, cup-like housing 198. In turn, said housing 198 is pressed within an opening 199 formed within the upper or normally vertical arm 200 of a mounting member 201 which is of general L-shape integrally having a lower or normally horizontal arm 202 which projects laterally outwardly of the associated bicycle with its longitudinal axis parallel to that of pedal crank arm 189. Said arm 202 is relatively narrow, and may be provided with a longitudinally extending tapered ridge 203 which tapers upwardly and outwardly from its inner end portion adjacent arm 200 for reinforcing purposes. Said normally horizontal arm 202 underlies foot support member 188 which is disposed thereupon and engaged thereto as by screws, rivets, or like fastening members indicated at 204. Said foot support member 188 extends forwardly of arm 202, as at 205, and in its forward end portion is engaged, as by rivets 206, to a conventional toe clip 207, the upper rearward portion of said latter contains the usual loop 208 for threading therethrough of a conventional retaining strap 209. Said strap 209 in its side portions extends through slot-like apertures 210,211 in foot support member 188 for extension of said strap beneath said member 188. Apertures 210,211 are located on opposite sides of support member 188 immediately rearwardly of the attachment of the same to mounting member arm 202, and, if desired, a further aperture 211′ may be presented laterally outwardly of aperture 211 to provide an alternate passage for threading of said strap 209 for accommodation of the particular rider's foot.

As considered from the normal position during operation, said plate 188 extends rearwardly of arm 202 to provide adequate surface for receiving the operator's foot and with its outer side edge 212 being rearwardly and outwardly inclined and of relatively greater length than its inner side edge 213; the rear end edge being laterally outwardly and rearwardly inclined, as at 214, throughout the major portion of its extent and being continuous with a short end section 215 substantially perpendicular to outer side edge 212. For strengthening purposes, and thus permitting of relative lightness in weight, support member 188 is provided along its opposite side edges 212,213 with upstanding flanges 216, 217, respectively; there being a similar flange 218 along rearward end section 215. Throughout the extent of rearward edge 214, which is inclined, there is provided a relatively shallow downturned reinforcing flange 219.

Provided for disposition in the rearward outer portion of support member 188 is a counterweight 220 which may consist, as shown, for example only, of a vertically presented bar which is maintained in secured position against either flange 216 or 218 by a screw 221. It will be seen that pedal P, in addition to providing the low-slung disposition for the advantages obtainable thereby, is also adapted for automatically swinging into vertical disposition upon removal of the operator's foot, with counterweight 220 being presented downwardly so that end edge section 215 is disposed for engaging the support surface and thereby serving as a support stand. The associated toe clip 207 will be automatically presented in downwardly opening condition so that entry thereinto by the operator's foot upon resumption of bicycle operation may be comfortably and reliably effected.

In the event the support stand feature of pedal P may not be desired, counterweight 220 may be removed by loosening of screw 221 and support member 188 can be so related to mounting arm 202 that the portion extending rearwardly from the axis of said arm 202 will counterbalance the portion projecting forwardly thereof with the toe clip attached so that upon removal of the operator's foot, pedal P will automatically maintain a horizontal disposition and in such condition pedal P could be used as a substitute for standard pedals and standard toe clips which latter are consistently in upside down state when in disuse.

Referring now to FIGS. 10-15, inclusive, a still further form of pedal, indicated generally P′, is shown which is useful with bicycle A, above described, as well as bicycles generally. Pedal P′ is also of the low, or underslung character, and elements thereof corresponding to elements of pedal P above described will bear like reference numerals. Ball bearing assembly 196 is press fitted within an opening 222 provided in a block 223 of trapezoidal configuration. Mounted upon block 223 is a foot supporting assembly, indicated generally 224, being of stirrup character, and comprised of a pair of front and rear cooperating loop-forming elements 225,226 formed, as by stamping, from sheet metal. Each of said loop-forming elements 225,226 comprises spaced-apart inner or outer legs 227,228 which, at their upper ends, merge into a top component 229, and at their lower ends are interconnected by a base component 230. Throughout the major portion of their extent, each loop-forming element 225, 226 is angle-shaped in cross section, having a continuous facing flange 231 and an edge flange 232. The said loop-forming elements 225,226 are canted toward each other to present the confronting portions of their top components 229 in abutting relationship and thereby being in diverging relationship at their opposite ends so that their respective base components 230 are spaced apart. The edge flanges 232 or inner legs 227 of said elements 225,226 abut against the inwardly directed face of block 223 and are secured thereto, as by screws 233, which thus constitute the means of attachment of foot support assembly 224 to mounting block 223. It is to be observed that the facing flange portion of each base component 230 is serrated, as at 234, throughout its upper edge, which flanges jointly serve as a support for the operator's foot being functionally comparable to the tread strips of conventional pedals such as those shown at 19,19' hereinabove. As will be observed in FIG. 15, the facing flange portions of each base component 230 taper downwardly and inwardly along their lower portion, as at 235, thereby providing maximum strength in the zone merging into inner side leg 227 and providing maximum ground clearance at their outer or opposite ends in the event of lateral tilting of the bicycle during operation.

Figures 12, 13, 14, 15:
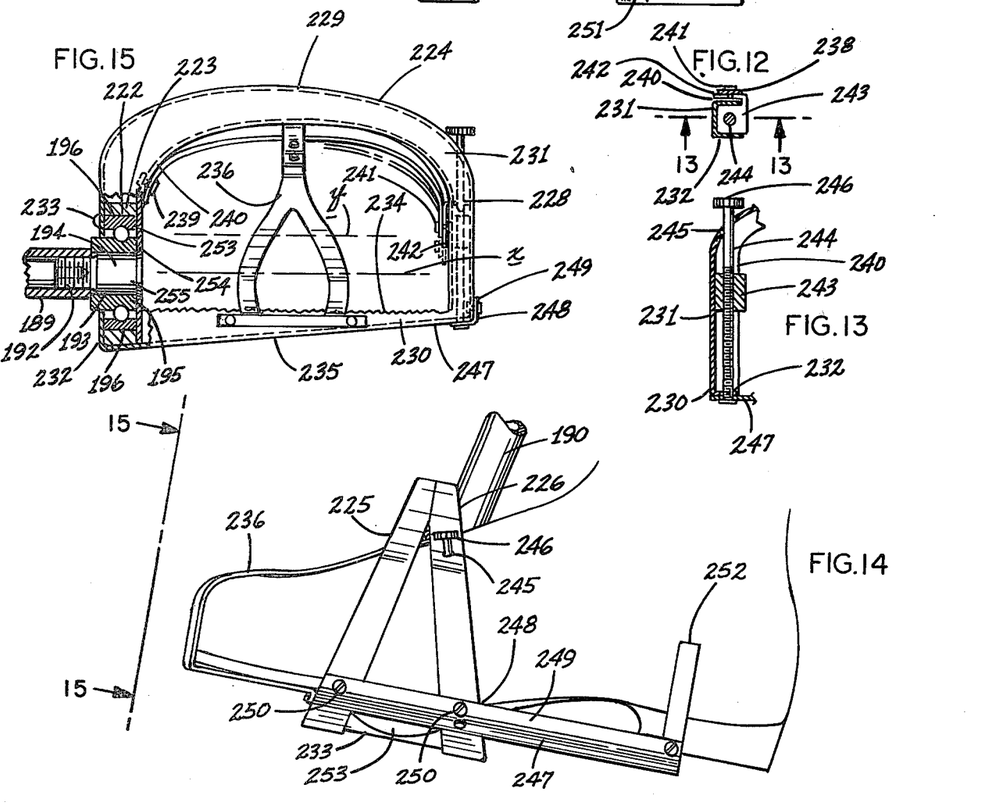
FIG. 12 is a horizontal transverse sectional view taken on the line 12—12 of FIG. 11.
FIG. 13 is a vertical transverse sectional view taken on the line 13—13 of FIG. 12.
FIG. 14 is a side elevational view taken substantially on the right hand side of FIG. 10 but illustrating the pedal disposed for cycling action.
FIG. 15 is a front end view taken substantially on the line 15—15 of FIG. 14.

Also with reference being made to FIG. 15, it will be observed that foot support serrated edges 234 are located spacedly downwardly of the axis x of pedal crank arm 189 so as to endow pedal P' with the aforestated low, or under-slung character.

Figure 10:
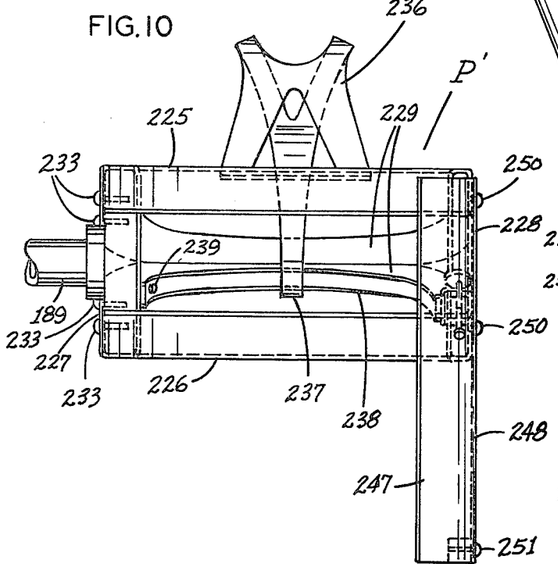
FIG. 10 is a front view of a still further form of toe clipped equipped pedal useful with bicycles of the present invention and being constructed in accordance with and embodying the present invention, illustrating the pedal in inoperative position; said pedal being of so-called under-slung character.
Figure 11:
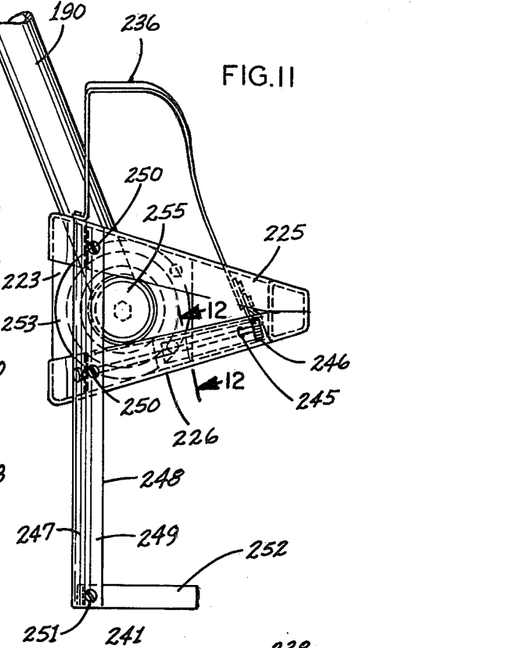
FIG. 11 is a side elevational view of the pedal taken on the right hand side of FIG. 10.

Fixed to the facing flange portion 231 of base component 230 of front loop-forming elements 225 by customary means is the lower end of a toe clip 236 of the usual character and with the upper end of the latter extending beneath the zone of contiguity of the top components of loop-forming elements 225,226 and having the usual loop 237 for threading therethrough of a length of strap 238 which extends transversely of pedal P' in substantial conformity to the configuration of the upper portion of foot supporting assembly 224. Strap 238 at its inner end is fixed as by a rivet 239 to a companion edge flange 240 provided on rear loop-forming element 226 and extending across top component 229 thereof and throughout the length of side leg 228 thereof. The other or outer end of strap 238 is fixed as by a rivet 241 upon an arm 242 carried upon a nut 243 which latter is engaged upon an adjusting screw 244 disposed within side leg 228 of rear loop forming element 226. Said screw 244 projects at its upper end through an opening 245 formed in the edge flange 232 of the adjacent portion of the associated top component 229 and having an enlarged knurled head 246 in its projecting portion for purposes of manipulation. Said screw 244 at its lower end is suitably engaged as within the edge flange 232 of the related base component 230 and the bottom flange 247 of an arm 248 (to be described presently) whereby said screw 244 is inhibited against movement longitudinally but permitted to rotate whereby nut 243 may be caused to travel relatively therealong. Said nut 243, as may best be seen in FIG. 12, is received snugly within facing flange 231, side flange 232 and cooperating flange 240 within side leg 228 of loop-forming element 226 so as to be restrained against rotation whereby upon turning of screw 244 said nut 243 will travel longitudinally of screw 244 and carry with it the attached end of strap 238 to permit of snug disposition of the same upon the user's foot.

Arm 248 is of angle shape having an outer side flange 249 planarwise normal to bottom flange 247 and being secured to the lower end portions of edge flanges 232 of outer side legs 228 of front and rear loop-forming elements 225,226 as by screws 250. Said arm 248 extends to a point spacedly rearwardly of foot supporting assembly 224 and at its end extremity mounts, as by a screw 251, a weighted support stand 252 of elongated, block-like form, the longitudinal axis of which is perpendicular to the longitudinal axis of arm 248. It will be observed that in usage, said stand 252 will be located laterally outwardly of the operator's foot so as to provide no interference therewith.

When the operator removes his foot from pedal P', the said stand 252 will so counterweight pedal P' as to cause same to swing into the condition shown in FIG. 11 wherein said stand will engage the support surface, presenting toe clip 236 in downwardly opening condition. Thus, pedal P' provides a sturdy, yet relatively lightweight, pedal which is of the aforesaid low, or under-slung character, having a support stand for automatically disposing the pedal in bicycle supporting condition when in disuse, as well as providing an enclosed, stirrup-like arrangement for reliable reception of the operator's foot and thereby inhibiting accidental displacement during usage. Ball bearing assembly 196 is protected on its outwardly directed side by a dust cover 253 constituted of a flat disc fabricated as of plastic and having a central opening, as at 254, for engaging the rim 255 formed at the outer end of screw head portion 194.

Referring now to FIGS. 16-20, inclusive, a still further form of pedal, indicated P", is illustrated which, as will be more fully developed hereinbelow, is adapted for general or standard usage for replacing the usual toe clip equipped pedal, as well as being adapted for use with bicycle A, hereinabove described. Pedal P", like pedals P and P' above described, is of the under-slung type, providing a relatively low center of gravity, and with its foot supporting portion relating to the axis x and line y as above described in conjunction with said aforementioned pedals P and P'. Elements of pedal P" which correspond to elements of pedal P and/or P' above described will, for purposes of brevity, bear like reference numerals. Ball bearing assembly 196 is press fitted within an opening 260 provided within a mounting block 261, with there being dust covers or shields 262,263 provided on the outer and inner faces of ball bearing assembly 196 within opening 260; the same being of disc-like character and each being centrally apertured for respectively accommodating screw head rim 255 and outer race 195. Mounting plate 261, downwardly of opening 260 and forwardly and rearwardly thereof, mounts laterally projecting, axially parallel forward and rearward support arms 264,265, respectively. Said arms 264,265 are each of angle configuration in cross section, each having a vertical flange 266 and a bottom flange 267. Each of said arms 264,265 at their inner ends are pressed into openings 268,269, respectively, formed in said mounting block 261, which openings are of complementary contour to the received portions of said arms 264,265 and thus being of general L-shape. For maintaining said arms 264,265 rigidly within mounting block 261, screws 270 are provided for reception within aligned openings in mounting block 261 and the received portions of the vertical flange 266 of said arms 264,265.

Figure 16:
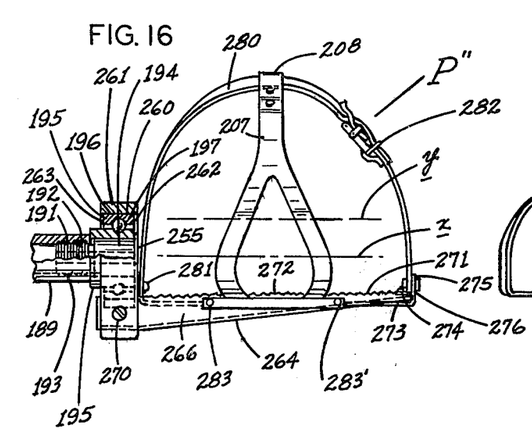
FIG. 16 is a front view, in partial section, of a still further form of pedal constructed in accordance with the present invention and being also of the under-slung character.
Figure 17:
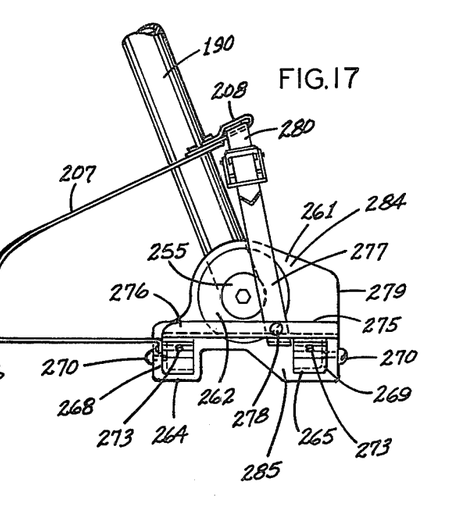
FIG. 17 is a side elevational view of the pedal shown in FIG. 16 and taken from the right hand side thereof.
Figure 18:
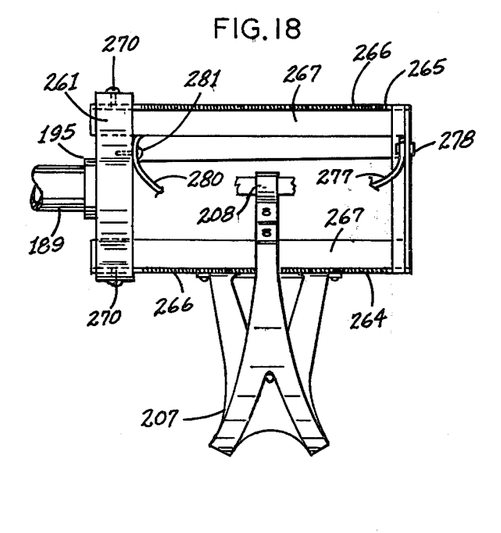
FIG. 18 is a top plan view.

The lower flanges 267 of each arm 264,265 are upwardly and outwardly inclined so that the associated vertical flange 266 is of maximum height at its inner end and of limited height at its outer end, but with its upper edge, as at 271, being horizontal and preferably serrated, corrugated, or the like, as at 272, to provide a foot-supporting tread. Thus, the taper of arms 264,265, while assuring of proper foot support for the operator, attains the same benefits as obtained by the taper in base components 230 of pedal P' and the taper of arm 202 in pedal P. It is to be particularly noted that arms 264,265 are so disposed with relation to mounting block 261 as to present the treads as provided at 272 downwardly of crank arm axis x to give the under-slung character to pedal P". Said arms 264,265, at their outer ends, are engaged as by rivets 273 to the base flange 274 of an angle shaped connector 275 having a vertical or upstanding outer flange 276. Thus, connector 275 integrates arms 264,265 in their outer portions into a stable foot supporting element and by its vertical flange 276 provides a point of attachment for the lower, outer end of a toe clip strap component 277, as by a rivet 278. Said connector 275 terminates at its rearward end substantially in alignment with the rearward edge 279 of mounting block 261. The strap component 277 cooperates with a companion strap component 280 which at its inner lower end is affixed to mounting block 261 as by a screw 281. The opposite or free ends of strap components 277, 280 are adapted for inner engagement by the customary buckle 282. Strap component 280 is threaded through loop 208 of toe clip 207, the lower end of which is affixed to flange 266 of forward arm 264 as by rivets at 283,283'.

With reference to FIG. 17, it will be seen that mounting block 261 is of non-symmetrical contour having its major area rearwardly of a vertical plane passing through the axis of rotation of crank arm 189 so that it is eccentrically weighted with respect thereto as evidenced by zones 284,285 which latter are of such extent as to offset the weight of toe clip 207, that is, to counterbalance same so that the tendency of toe clip 207 to rock pedal P" downwardly and rearwardly is countered by the tendency of block 261 through its particular configuration to rock pedal P" downwardly and forwardly. Thus, mounting block 261 is uniquely designed to cause pedal P" to remain in a horizontal, fully balanced condition even when in disuse and thereby obviate the need to associate same with the bicycle brakes or with a support stand since when the rider dismounts pedal P" will resist rocking and thereby remain in position for facilitating reception of the operator's foot upon resumption of use of the associated bicycle. Accordingly, pedal P" may replace standard pedals equipped with toe clips.

Figure 19:
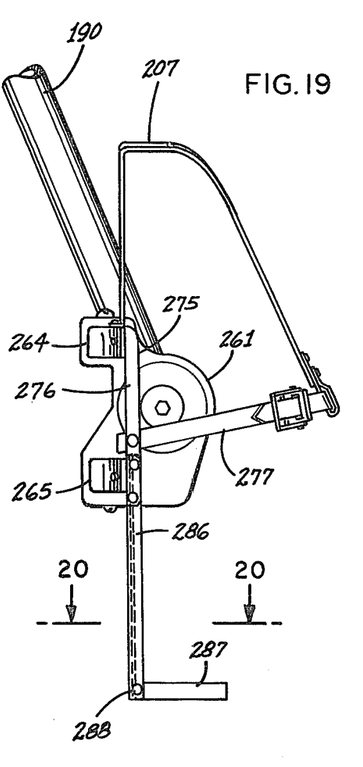
FIG. 19 is a side elevational view illustrating the pedal of FIG. 16 in a position of disuse and as maintained in position by a support stand element.
Figure 20:
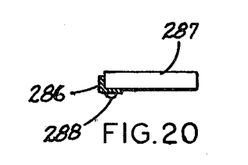
FIG. 20 is a horizontal transverse sectional view taken on the line 20—20 of FIG. 19.

As shown in FIGS. 19 and 20, pedal P" may, if desired, be adapted for use with pedal brakes as above described in conjunction with bicycle A, by affixation to the vertical flange 276 of connector 275 in its rearward portion, the forward end of a rearwardly projecting elongated arm 286 which at its rearward end extremity carries a light weight 287 which is preferably axially normal to arm 286 and secured thereto by a screw 288. Said weight 287 is in actuality a support stand so that when the operator's foot is removed from pedal P" the same will rock downwardly and forwardly from its rearward portion, disposing toe clip 207 in downwardly opening disposition (see FIG. 19), and with pedal P" being thus stabilized upon the support surface by said weight or stand 287. In view of the normally balanced character of pedal P", the addition of arm 286 or weight or stand 287, provides the requisite torque so that said pedal P" will automatically assume the position shown in FIG. 19 when in disuse. Pedal P" as so modified by said arm 286 or weight or stand 287 adapts same for utilization with the pedal brake arrangements described in connection with bicycle A. It must be remembered that in addition to the foregoing features pedal P" is of the under-slung character and, hence, provides the associated bicycle with the above discussed benefits of a pedal of such type.

With respect to pedals P, P', and P" it is to be observed that the same have been described as being mounted upon an internally threaded, relatively short crank arm 189. However, it is to be recognized that the cooperating head screws 193 could be just as easily secured within the threaded opening customarily found at the lower end of the conventional pedal crank as shown at 190 in the drawings. In this last context, there would be no necessity of providing a pedal crank arm.

I claim:

1. For use with a bicycle having a main shaft and a pedal crank in axially normal relationship to said main shaft, a pedal comprising a shaft-forming element secured to said pedal crank in its end portion remote from said main shaft and in axially perpendicular relationship thereto, and extending at its outer end laterally from said crank, the longitudinal axis of said shaft-forming element constituting a pivot axis, bearing means provided at the outer end of said shaft-forming element, pedal mounting means comprising a plate disposed upon said bearing means for carrying pedalling loads and transferring such loads to said bearing means, said plate having a portion extending downwardly of said shaft-forming element when said pedal is in operative disposition, at least one arm constituting a foot supporting means secured to said last mentioned portion of said mounting means, said arm projecting laterally outwardly from said portion of said last mentioned portion to provide a foot supporting upper surface of said arm lying within a plane parallel to said pivot axis and being disposed downwardly thereof when said pedal is in operative position, said arm tapering in thickness from its inner end at said plate to its plate remote outer end, said arm having a lower surface which is upwardly and outwardly inclined, so as to provide said arm with maximum height at its said outer end to constitute a lowermost structure of said pedal at said outer end which is upward of the lowermost structure of said pedal at said inner end to provide maximum ground clearance upon tilting of said bicycle during operation, and a toe clip carried forwardly of said arm, said plate extending both forwardly and rearwardly of said bearing means, the portion of said plate rearwardly of said bearing means being of greater extent than that forwardly thereof for not only carrying pedalling loads but also creating a torque counterbalancing said toe clip when said pedal is in disuse.

2. The invention as defined in claim 1 and further characterized by said bearing means being a ball bearing having an inner race embracing said shaft-forming element and an outer race fixed in said mounting means whereby the latter is swingable about said pivot axis.

3. The invention as defined in claim 2 and further characterized by said pedal comprising a pair of said arms extending laterally outwardly from said mounting means in horizontally spaced-apart relationship, the upper edges of said arms cooperating to define foot-receiving portions, and means rearwardly of the forward extremity of said toe clip projecting upwardly from each arm defining an opening for extension therethrough of the user's foot.

4. The invention as defined in claim 2 and further characterized by said arms of said pedal comprising forward and rearward arms extending laterally outwardly from said mounting means in normally horizontal spaced relationship, frame-forming means being continuous with said arms at their outer ends and being directed upwardly and laterally inwardly toward said mounting means for defining an opening for receiving the operator's foot.

5. The invention as defined in claim 4 and further characterized by said toe clip being engaged at one end thereof to said arm and at the other end thereof to the upper portion of said frame, and means for adjusting said toe clip.

6. The invention as defined in claim 1 and further characterized by a support stand member carried on said arm and projecting rearwardly therebeyond.

7. The invention as defined in claim 6 and further characterized by said plate being of such extent, and the support stand of such weight, as to overcome any torque caused by said toe clip when said pedal is in disuse whereby the same will swing so as to cause said toe clip to open downwardly for facile reception of the operator's foot.

8. The invention as defined in claim 1 and further characterized by an elongated member fixed to the outer end portions of said arm and extending rearwardly of said arm, and a support stand member fixed at the rearward extreme portion of said member.

9. The invention as defined in claim 8 and further characterized by said support stand having its axis perpendicular to that of said elongated member and with said member and said support stand being of such extent and weight as to cause said pedal to be swung in disuse so as to cause said toe clip to open downwardly.

10. The invention as defined in claim 1 and further characterized by said foot supporting means comprising a pair of said arms, said arms being axially parallel and projecting laterally outwardly of said mounting means, means interengaging said arms at their outer ends for rigidifying said pedal.

11. The invention as defined in claim 10 and further characterized by a toe clip carried on said pedal for extension forwardly thereof, an elongated member engaged to said rigidifying means for extension rearwardly of said mounting plate when said pedal is in horizontal position, and a support stand extension rigidly carried at the rearward end of said elongated member, said support stand extension being axially perpendicular to said elongated member and being located rearwardly of said plate, said support stand extension and said elongated member each providing additional torque for causing said pedal to be rearwardly overbalanced and occupy a substantially vertical position with said toe clip opening downwardly and with said support stand extension disposed for supporting said bicycle.

12. The invention as defined in claim 10 and further characterized by a toe clip provided on said pedal for extension forwardly thereof, the rearward portion of said plate being of greater area than the corresponding forward portion of said plate and being dimensioned for balancing the torque normally created by said toe clip so that when said pedal is in disuse it will automatically remain in balanced horizontal disposition with said toe clip opening rearwardly.

* * * * *